June 5, 1923.  1,458,087

R. P. TOOLEY ET AL

SAFETY VALVE

Filed July 8, 1922

R. P. Tooley
C. W. Johnson
INVENTOR

BY Victor J. Evans
ATTORNEY

WITNESS:

Patented June 5, 1923.

1,458,087

UNITED STATES PATENT OFFICE.

ROY P. TOOLEY AND CHARLES W. JOHNSON, OF WICHITA FALLS, TEXAS.

SAFETY VALVE.

Application filed July 8, 1922. Serial No. 573,550.

*To all whom it may concern:*

Be it known that we, ROY P. TOOLEY and CHARLES W. JOHNSON, citizens of the United States, residing at Wichita Falls, in the county of Wichita and State of Texas, have invented new and useful Improvements in Safety Valves, of which the following is a specification.

This invention relates to valves and has particular application to rotary plug valves of the type generally used in conjunction with gas ranges or the like, the invention having for its primary object, the provision of a valve of this character designed to prevent escape of gas after the valve has been closed, and subsequently opened casually, or without notice to the consumer.

More specifically stated, the invention provides a valve having the usual port or opening for the passage of the gas or other fluid, the valve being provided with recesses at diametrically opposite points, and a ball or the like arranged to operate within said bore, the ball occupying a position in one of the recesses when the valve is opened, and gravitating to a position at the lower end of the bore when the valve is closed. The said ball should the gas be turned on casually or without notice to the consumer, is forced forwardly in the bore under sufficient pressure to prevent the escape of gas.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1:
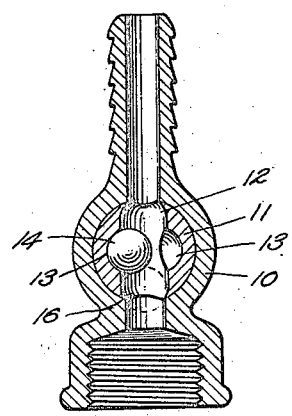
Figure 1 is a sectional view through the valve showing the position of the ball when the valve is being used.
Figure 2:
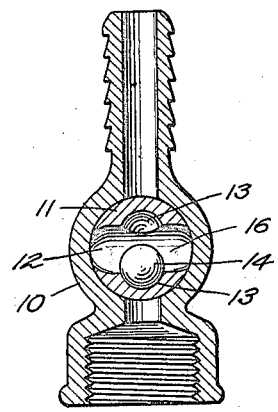
Figure 2 is a view showing the position of the ball when the valve is closed.
Figure 3:
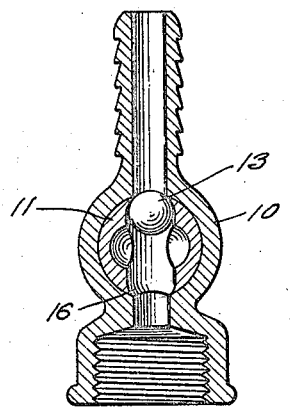
Figure 3 is a view showing the position of the ball to prevent the escape of gas.
Figure 4:
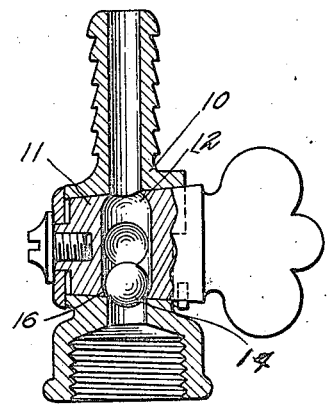
Figure 4 is a sectional view through the valve proper.

Referring to the drawing in detail, 10 indicates a valve casing of well known construction designed to accommodate the rotary plug valve 11. The latter is provided with a transverse bore or port 12, through which the fluid passes when the valve is opened, and also provided with diametrically opposed recesses 13, which are arranged at opposite sides of the bore 12 in communication therewith.

These recesses are of semi-spherical configuration, and are adapted to receive the ball 14 which operates within the bore 12 in a manner to be presently described, to prevent the escape of gas should the valve be casually opened under any circumstances. The recesses are the size of the ball and a little less than one-half of its diameter in depth, this enabling the gas or fluid to pass through the bore 12 when the valve is opened, the gas or fluid assisting in holding the ball in this position. However, when the valve is closed, the ball gravitates to the lower part of the bore 12 as illustrated in the drawing. A small annular flange projects inwardly from the lower end of the bore 12, and is indicated at 16, this flange constituting a support for the ball to prevent the latter from passing from the bore when it gravitates to the lower end thereof. When the valve is opened, the ball occupies a position in one of the two recesses, as above stated, and the gas passing through the bore assists in holding the ball in this position. When the gas is cut off, by the gas company, thereby removing this pressure, the ball drops to the bottom of the hole or flange 16. When the gas is again turned on and the pressure built up sufficiently to raise the ball within the bore 12, the ball travels to the upper end thereof preventing the escape of gas. Now, when it is desired to use the range, it is only necessary to turn the valve to its closed position, which allows the ball to drop into one of the recesses and then turn the valve to its opened position, the ball remaining within the recess being so held in this position by the pressure passing through the bore 12.

It is of course to be understood that to operate the valve successfully, the axis thereof must always be in a horizontal plane when gas is passing through the bore 12.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

What we claim is:—

A valve comprising a valve casing, a rotary valve plug operating therein and having a transverse bore reduced at both ends, a ball valve arranged to operate within the bore, and closing the upper end thereof to prevent the escape of gas when the valve is casually opened, said valve having diametrically opposed recesses communicating with and merging into the bore of the valve and adapted to receive said valve and hold the latter in an out of the way position when the valve is opened, one of said recesses receiving the ball when the plug is turned to a closed position, and each recess being slightly less than one-half of the diameter of the ball in depth for the purpose specified.

In testimony whereof we affix our signatures.

ROY P. TOOLEY.
CHARLES W. JOHNSON.